Patented July 17, 1934

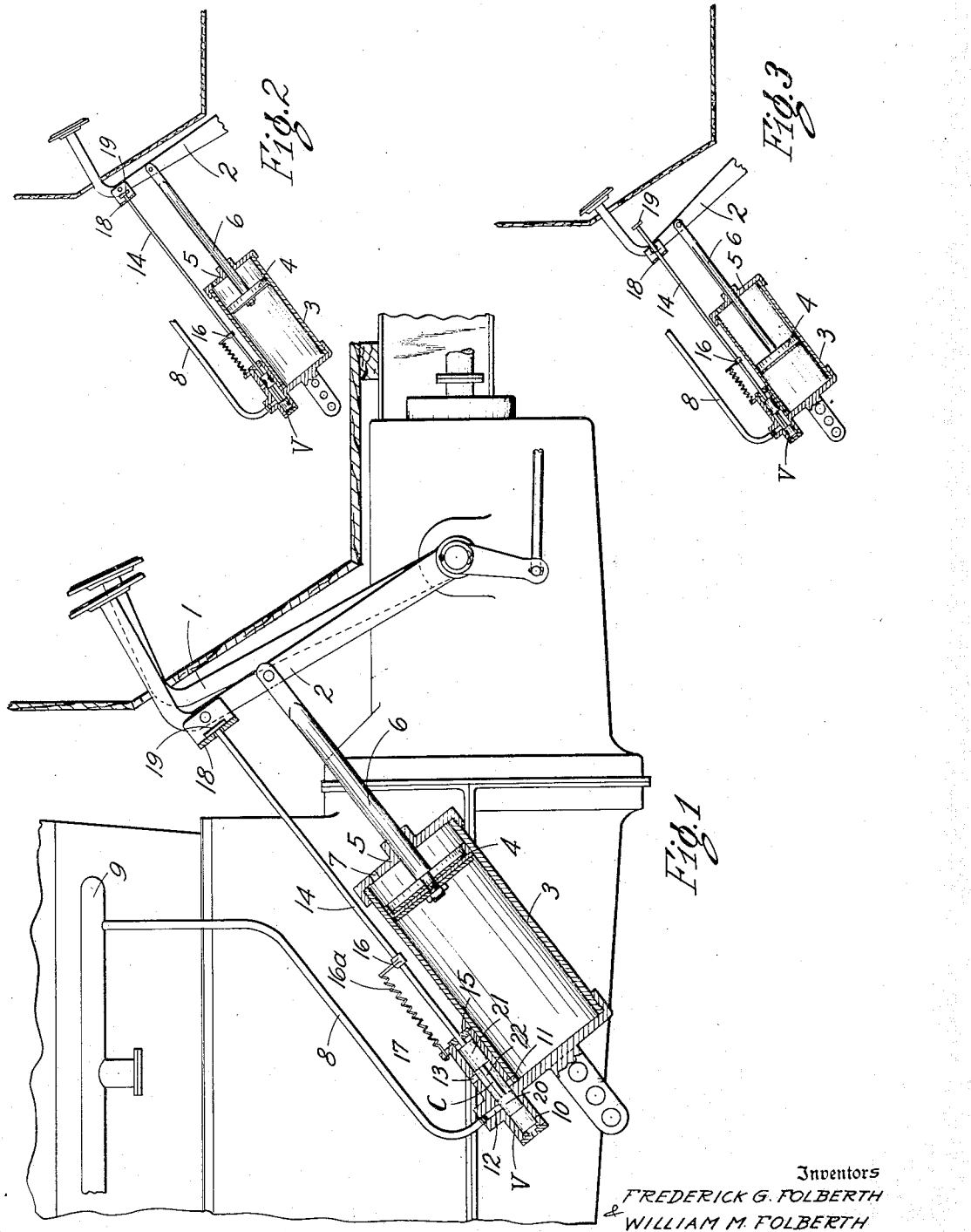

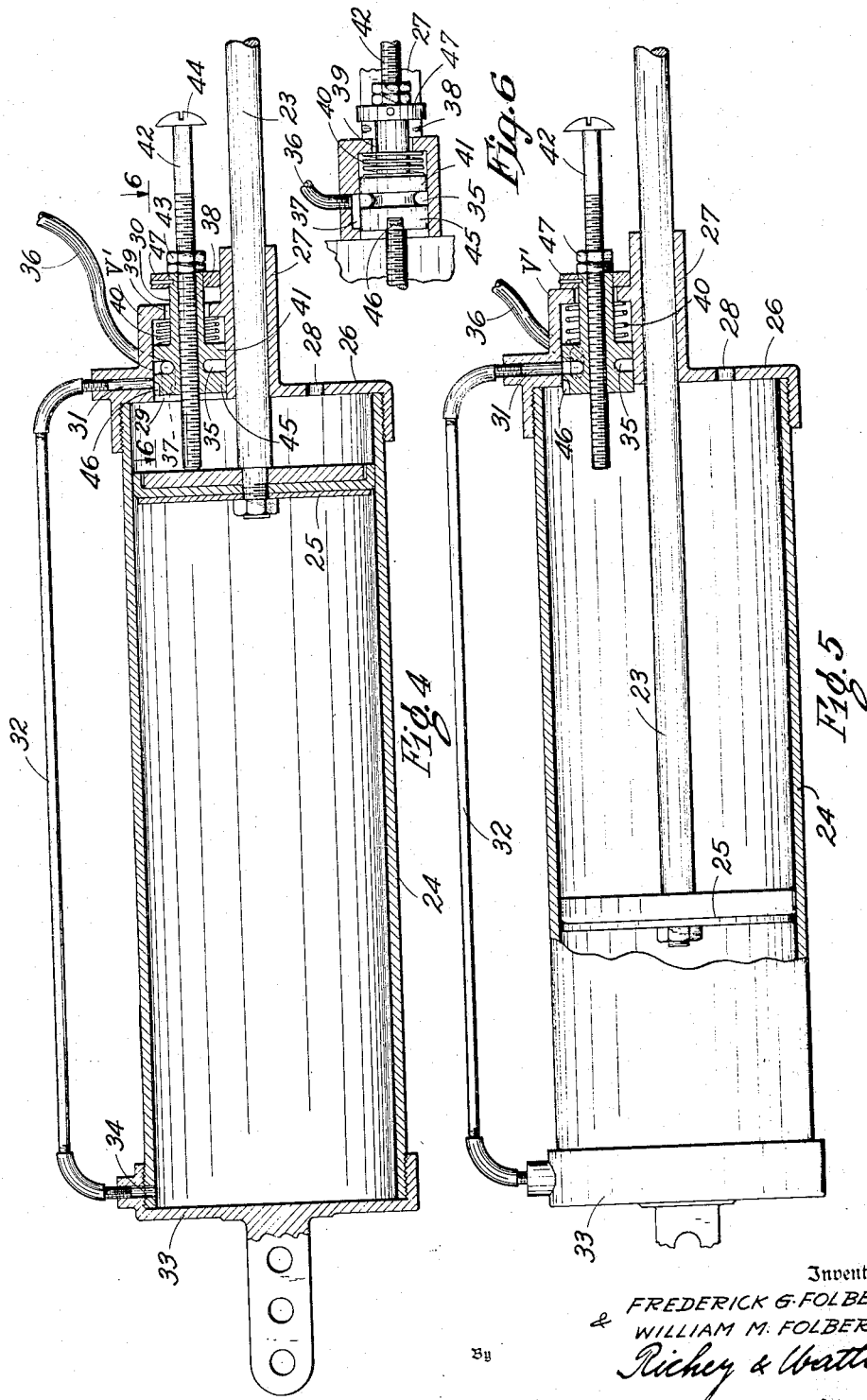

1,966,622

UNITED STATES PATENT OFFICE 1,966,622

FLUID PRESSURE ACTUATED MECHANISM

Frederick Gustave Folberth and William M. Folberth, Cleveland, Ohio

Application April 18, 1932, Serial No. 605,950

11 Claims. (Cl. 192—91)

This invention relates to fluid pressure actuated mechanisms and more particularly to fluid pressure actuated means for reducing the effort required on the part of the operator of a motor vehicle for operating the vehicle clutch.

In our co-pending United States patent application, Serial No. 556,624, filed August 12, 1931, we have disclosed and claimed apparatus for facilitating the operation of a vehicle clutch which includes a fluid pressure actuated cylinder and piston and a valve which is adapted to control the flow of operating fluid to and from the cylinders. In the apparatus illustrated in our co-pending application this control valve is operable by the movement of the clutch mechanism at the beginning and the end of the stroke of the clutch mechanism.

The present invention relates to apparatus having the same general functions as that described in the above noted co-pending application but which utilizes a different valve controlling mechanism and mode of operating same.

In the standard control mechanism for automotive vehicles the clutch is actuated by a foot pedal. In order to maintain the proper driving connection between the engine and the rear wheels of the vehicle strong springs must be utilized to maintain the clutch in engagement. In order to disengage the clutch it is necessary for the operator to overcome these springs and this requires considerable effort on his part. This is particularly true in the case of heavy busses and trucks and it is among the objects of our invention to provide means for reducing the effort necessary on the part of the operator to disengage the clutch of an automotive vehicle.

Further objects are: the provision of means actuated by the vacuum created in the intake manifold of an internal combustion engine together with an improved valve for controlling the connection between the fluid pressure actuated means, the intake manifold and the atmosphere; the provision of simple and effective apparatus for reducing the effort necessary to disengage a vehicle clutch which is adapted to be readily installed on present-day vehicles; the provision of a fluid pressure actuated mechanism for assisting in the disengagement of a vehicle clutch which is susceptible to economical manufacture, installation and upkeep.

The above and other objects of our invention will appear from the following description of several embodiments thereof, reference being had to the accompanying drawings in which—

Figure 1 is a fragmentary view illustrating a portion of an automotive vehicle including the engine and the foot pedal controls, together with our apparatus installed, the parts being in the positions they assume when the clutch is engaged.

Figure 2 is a view generally similar to Figure 1 but illustrating only the clutch pedal and the actuating apparatus with the parts in the positions they assume when the clutch pedal has been moved initially in clutch disengaging direction.

Figure 3 is a view similar to Figure 2 but illustrating the parts in the positions they assume when the vehicle clutch is completely disengaged.

Figure 4 is a detached cross sectional view of an operating cylinder and piston together with a modified form of valve which is adapted to control the flow of actuating fluid to and from the cylinder. In Figure 4 the parts are in the positions they assume when the clutch is engaged.

Figure 5 is a view of the apparatus shown in Figure 4 but illustrating the parts in the positions they assume when the clutch is disengaged and the fluid control valve has moved to connect the cylinder to the source of actuating fluid pressure.

Figure 6 is a horizontal section taken on line 6—6 of Figure 4.

Referring now to Figure 1, the foot operated lever 1 is the usual brake operating lever of the vehicle and the lever 2 is the usual clutch operating member and may be connected to effect the disengagement of the vehicle clutch in any desired manner. A fluid pressure cylinder 3 is suitably mounted on the vehicle and carries the piston 4 reciprocally mounted therein. Extending out through the end cap 5 of the cylinder 3 is a piston rod 6 which is pivotally secured at its outer end to the clutch operating lever 2. The end cap 5 of the cylinder 3 is provided with a vent hole 7 which permits free flow of air into and out of the upper end of the cylinder 3. At the lower end of the cylinder 3 is disposed the control valve mechanism generally indicated at V. A conduit 8 extends from the intake manifold 9 of the vehicle to the valve V. The valve V includes a double ended piston closure member C which is slidably mounted in the cylindrical housing 10. An aperture 11 extends from the interior of the cylindrical housing 10 into the cylinder 3 and the conduit 8 is connected to the interior of the housing 10 by a passage 12 and the vent 13 connects the interior of the valve housing 10 to the atmosphere.

To the upper end of the closure member C is secured a rod 14 which passes out of the valve housing 10 through an end gap 15. At a point on the rod 14, upwardly removed from the end cap 15 of the valve V, is secured a bracket 16 and a spring 16a, normally under tension, extends from the bracket 16 to the lug 17 on the valve V.

The upper end of the rod 14 passes through an aperture in the angle bracket 18 which is secured to the clutch operating lever 2. The flanged head 19 at the end of the rod 14 is adapted to be engaged by the bracket 18 for purposes which will be described later.

Referring to Figure 1 the operation of the above described apparatus will be readily understood. The spring 16a, being under tension, normally tends to maintain the closure member C of the valve V at the bottom or left hand (Fig. 1) end of the housing 10. However, when the vehicle clutch is engaged and the lever 2 is in its raised position, the bracket 18 engages the underside of the flanged head 19 on the rod 14 and lifts the rod 14 together with the closure member C against the effort of the spring 16a. As the closure member C comprises two separate piston closure members 20 and 21 which are connected by a portion 22 of reduced cross section, it will be seen that when the clutch is in its completely engaged position the closure member 20 will be located in a position to close off the passage 12 and the conduit 8 from the interior of the cylinder 3. The interior of the cylinder 3, however, will be connected to the atmosphere through the aperture 11, the space around the reduced portion 22 of the closure member C and the aperture 13. As the cylinder 3 is now connected at both ends to the atmosphere it will not affect the clutch mechanism in any way and the full force of the clutch springs will be utilized to cause engagement thereof.

Referring now to Figure 2 we may assume that the operator has pushed down on the clutch pedal 1 and has moved the lever 2 a relatively slight amount. As the lever 2 moves downwardly it carries with it the bracket 18. This downward movement of the bracket 18 releases the rod 14 and permits the spring 16a to move the closure member C downwardly in the valve housing 10. Thus, within the first very small downward movement of the clutch pedal, the closure member C is moved into a position where the cylinder 3 is connected to the intake manifold suction through the opening 11, the space around the reduced portion 22, the passage 12 and the conduit 8. The atmospheric connection to the lower end of the cylinder 3 is closed off by the piston closure 21 which closes the hole 13 in the valve housing. As soon as the closure member C has moved into the position shown in Figure 2, which movement takes place during the initial movement of the clutch pedal, the intake manifold suction is connected to exert a downward pull, through the piston 4 and the connecting rod 6, on the clutch operating lever 2. The size of the cylinder 3 and area of the piston 4 are so proportioned with relation to the maximum vacuum produced in the intake manifold that at no time will the force exerted by the piston be greater than the strength of the clutch spring. It will be seen that this is desirable as, if a force great enough to completely overcome the clutch spring was applied by the cylinder and piston, the clutch could not be reengaged until the effective vacuum was reduced.

From the above it will be seen that as soon as the operator pushes slightly downwardly on the clutch pedal the intake manifold vacuum is applied to assist him in overcoming the strength of the clutch spring. Further downward movement of the clutch operating lever 2 from the position shown in Figure 2 merely causes the bracket 18 to slide over the rod 14 and does not move the valve V further.

When the operator removes his foot from the clutch pedal the clutch springs which, as above noted, are strong enough to overcome the greatest possible pull of the piston 4, act to engage the clutch and move the actuating lever 2 to its normal position. The last part of the upward movement of the lever 2 causes the flange 18 to engage the head 19 of the rod 14 and move the closure member C into position to shut off the lower end of the cylinder 3 from the intake manifold and connect it to the atmosphere. Thus, the effect of the intake suction on the piston 4 will be eliminated and the full strength of the clutch springs will be utilized to engage the clutch.

In the apparatus illustrated in Figures 4 and 5 the valve mechanism V and the rod 14 are replaced by a valve mechanism generally indicated by V' which is actuated by the piston rather than by the clutch lever. The assembly of the cylinder and valve arrangement of Figures 4 and 5 on the vehicle may be the same as that shown in Figure 1 with the exception that the only connection between the clutch lever 2 and the fluid pressure mechanism is the piston rod 23. The cylinder 24 carries the piston 25 to which is secured the piston rod 23. The end cap 26 of the cylinder 24 is provided with a bearing portion 27 for the piston rod 23 and carries the valve V'. A vent hole 28 in the end cap 26 establishes constant communication between the piston rod end of the cylinder 24 and the atmosphere.

A cylindrical valve chamber 29 is formed in the end cap 26 and the cylindrical piston type closure member 30 is slidably disposed in the valve chamber 29. Leading from the chamber 29 is a passage 31 which connects with the conduit 32, the other end of which is connected to the end cap 33 on the opposite end of the cylinder 24 and to a passage 34 which extends into the cylinder 24 through the wall thereof. An annular groove 35 is formed in the closure member 30 and the conduit 36, which is adapted to be connected to the intake manifold of the vehicle engine, opens into a recess 37 in the wall of the cylindrical chamber 29. This is best seen in Figure 6.

The closure member 30 is provided with a stem portion 38 which extends out through an aperture 39 at the end of the cylindrical chamber 29 and a coil spring 40, normally under compression, is disposed between the end wall of the chamber 29 and the portion 41 of the closure member. A rod 42 extends through and has threaded engagement with the closure member 30. Lock nuts 43 may be provided to lock the rod 42 in the desired position, as will be later explained, and the rod 42 may be provided with a slotted end 44 to facilitate adjustment thereof.

The operation of the apparatus illustrated in Figures 4, 5 and 6 is as follows:

When the clutch is in engaged position the piston 25 and piston rod 23 will be maintained in the position shown in Figure 4 and the piston 25 will engage the inner end of the rod 42 thus holding the closure member 30 in the position shown against the force of the spring 40. It will be seen that, when the parts are in the positions shown in Figure 4, the portion 45 of the closure member 30 will close off the passage 31 from the recess 37 and the conduit 36 and thus close off the left hand end of the cylinder 24 from the intake manifold of the vehicle. At the same time the left hand end of the cylinder 24 will be connected to the atmosphere through the grooved passage 46 in the portion 45 of the closure member 30. This groove 46 is adapted to connect the passage 31 to the piston rod end of the cylinder 24 which in turn is connected to the atmosphere through the opening 28 in the end cap 26. The width of the groove 46 is preferably substantially equal to the diameter of the passage 31 and therefore the groove 46 does not interfere with the action of the portion 45 of the closure member 30 to seal the intake manifold from the cylinder 24. This feature is shown in Figure 6 of the drawings.

When the clutch lever is given an initial downward movement it pushes the piston 25 to the left from the position shown in Figure 4 and this movement permits the spring 40 to push the closure member 30 to the left until the flange 47 strikes the valve housing, as shown in Figure 5. When this occurs the annular recess 35 will be in alignment with the passage 31 and the intake manifold suction will be connected to the left hand end of the cylinder through the conduit 36, the recess 37, the annular groove 35, the passage 31, the conduit 32 and the passage 34. As soon as this connection is established the reduced pressure within the cylinder permits the atmospheric pressure to force the piston 25 to the left (Fig. 5) thus assisting the operator to disengage the vehicle clutch. The flange 47 engages the bearing 27 to prevent rotation of the closure member 30.

It will be understood that, in this embodiment of our invention as well as that shown in Figures 1, 2 and 3, the size of the cylinder and piston will be so proportioned and the connections between the piston and clutch will be so designed that a force greater than the strength of the clutch springs can never be exerted on the clutch operating mechanism at the particular point where it is applied. By adjusting the position of the screw rod 42 in the closure member 30 the proper action can be obtained and compensation be made for variation in clutch adjustment.

We have illustrated an embodiment of our invention in which the lower than atmospheric pressure in the vehicle engine intake manifold is utilized as the actuating pressure to create the clutch disengaging force. The term "actuating pressure" as used in this specification and the appended claims refers to this low pressure. However, it will be understood by those skilled in the art that any other suitable source of actuating pressure, either greater or less than atmospheric pressure, may be utilized without departing from the spirit of our invention and scope of our claims.

Although we have illustrated our improved fluid pressure mechanism as adapted to facilitate the operation of the clutch of an automotive vehicle it will be understood by those skilled in the art that it may be utilized to facilitate the operation of a number of different devices and we do not, therefore, wish to limit our invention to the particular adaptations and forms illustrated and described herein, but claim as our invention all embodiments thereof coming within the scope of the appended claims.

We claim:

1. In automotive vehicle control apparatus, a cylinder, a piston in said cylinder, operating connections between said piston and the clutch operating mechanism of the vehicle, a source of actuating fluid pressure, pressure conducting connections between said source and said cylinder, a valve adapted to control the connection of said actuating fluid pressure and atmospheric pressure to said cylinder on one side of said piston, means for exerting a force tending to maintain said valve in position to connect the actuating fluid pressure to the cylinder and means, effective during the final engaging movement of the vehicle clutch mechanism, for actuating said valve to close said actuating fluid pressure connection to said cylinder.

2. In automotive vehicle control apparatus, a cylinder, a piston in said cylinder, operating connections between said piston and the clutch operating mechanism of the vehicle, a source of actuating fluid pressure, pressure conducting connections between said source and said cylinder, a valve adapted to control the connection of said actuating fluid pressure and atmospheric pressure to said cylinder on one side of said piston, means for exerting a force tending to maintain said valve in position to connect the actuating fluid pressure to the cylinder, and means, effective during the final engaging movement of the vehicle clutch mechanism, for actuating said valve to close said actuating fluid pressure connection to said cylinder and connect said cylinder to the atmosphere.

3. In vehicle control apparatus including clutch mechanism, a cylinder having a piston therein, operating connections between said piston and the vehicle clutch mechanism and valve means, controlled by the initial disengaging movement and the final engaging movement of said vehicle clutch, for completing connections between said cylinder and a source of actuating fluid pressure during the initial clutch disengaging movement and between said cylinder and the atmosphere during the final clutch engaging movement.

4. In apparatus of the class described, in combination with a clutch and operating mechanism therefor, fluid pressure actuated means connected to said clutch operating mechanism and adapted to exert a force tending to move said clutch in disengaging direction, a valve for controlling said fluid pressure actuated means, said valve having resilient means tending to maintain the valve in position to connect a source of actuating fluid pressure to said fluid pressure actuated means, and means, operable by said clutch operating mechanism when said clutch moves into engaged position, for moving said valve into position to close the connection between said fluid pressure actuated means and the source of actuating pressure.

5. In apparatus of the class described, in combination with a clutch operating mechanism therefor, fluid pressure actuated means connected to said clutch operating mechanism and adapted to exert a force tending to move said clutch in disengaging direction, a valve for controlling said fluid pressure actuated means, said valve having resilient means tending to maintain the valve in position to connect a source of actuating fluid pressure to said fluid pressure actuated means, and means, operable by said clutch operating mechanism when said clutch moves into engaged position, for moving said valve into position to close the connection between said fluid pressure actuated means and the source of actuating pressure, and connect the fluid pressure actuated means to the atmosphere.

6. In apparatus for operating the clutch of an automotive vehicle, a clutch operating lever, fluid pressure actuated means connected to said clutch operating lever and adapted to exert a force tending to disengage the clutch, a source of actuating fluid pressure, fluid pressure conducting connections between said source of actuating fluid pressure and said fluid pressure actuated means, a valve having a closure member adapted when in one position to shut off said source of supply of actuating pressure from the pressure actuated means and connect the pressure actuated means to the atmosphere and when in another position to connect the fluid pressure actuated means to the source of actuating pressure and shut off the atmospheric connection, resilient means tending to maintain said closure member in said second named position, and means for connecting said closure member to the vehicle clutch mechanism whereby the closure member will be maintained in said first named position when the clutch is engaged and will be permitted to be moved into said second named position by said resilient means when said clutch is disengaged.

7. In apparatus of the class described, a clutch operating lever, a fluid pressure cylinder having a piston therein, a valve for controlling the flow of actuating fluid to and from said cylinder, and operating connections between said valve and said clutch operating lever including a rod having an enlarged end, a flange on said operating lever having an aperture for said rod, said flange being adapted to engage the enlarged end of said rod when the clutch lever approaches its fully engaged position and to slide on said rod when said lever moves in clutch disengaging direction.

8. In apparatus of the class described, a clutch operating lever, a fluid pressure cylinder having a piston therein, a source of supply of actuating pressure, fluid conducting connections between said cylinder and said source of actuating pressure, a valve for controlling the flow of actuating fluid through said connections, operating connections between said piston and said clutch operating lever, a resilient means tending to maintain said valve in position to connect said cylinder to said source of actuating pressure and means, adapted to be engaged by said piston during the latter part of its clutch engaging movement, for moving said valve into position to disconnect said cylinder from said source of actuating pressure.

9. In apparatus of the class described, a clutch operating lever, a fluid pressure cylinder having a piston therein, a source of supply of actuating pressure, fluid conducting connections between said cylinder and said source of actuating pressure, a valve for controlling the flow of actuating fluid through said connections, operating connections between said piston and said clutch operating lever, resilient means tending to maintain said valve in position to connect said cylinder to said source of actuating pressure and means for moving said valve into position to disconnect said cylinder from said source of actuating pressure, said last named means including a rod extending into said cylinder and connected to said valve and adapted to be engaged by said piston during the latter part of its clutch engaging movement.

10. In apparatus of the class described, a clutch operating lever, a fluid pressure cylinder having a piston therein, a source of supply of actuating pressure, fluid conducting connections between said cylinder and said source of actuating pressure, a valve for controlling the flow of actuating fluid through said connections, operating connections between said piston and said clutch operating lever, resilient means tending to maintain said valve in position to connect said cylinder to said source of actuating pressure and adjustable means, adapted to be engaged by said piston during the latter part of its clutch engaging movement, for moving said valve into position to disconnect said cylinder from said source of actuating pressure.

11. In vehicle control apparatus including clutch operating mechanism, fluid pressure actuated means connected to said clutch operating mechanism and adapted to exert a force tending to move the clutch in disengaging direction, and valve means, controlled by the initial disengaging movement and the final engaging movement of the vehicle clutch mechanism for completing connections between said fluid pressure actuated means and a source of actuating fluid pressure during the initial clutch disengaging movement and between said fluid pressure actuated means and the atmosphere during the final clutch engaging movement.

FREDERICK GUSTAVE FOLBERTH.
WILLIAM M. FOLBERTH.